United States Patent
Gray (10) Patent No.: US 12,504,073 B2
(45) Date of Patent: Dec. 23, 2025

(54) OIL SCRAPER RING AND PISTON RING SET FOR AN INTERNAL COMBUSTION ENGINE

(71) Applicant: FEDERAL-MOGUL BURSCHEID GMBH, Burscheid (DE)

(72) Inventor: Nigel Gray, Leverkusen (DE)

(73) Assignee: FEDERAL-MOGUL BURSCHEID GMBH, Burscheid (DE)

( * ) Notice: Subject to any disclaimer, the term of this patent is extended or adjusted under 35 U.S.C. 154(b) by 181 days.

(21) Appl. No.: 18/040,646

(22) PCT Filed: May 19, 2021

(86) PCT No.: PCT/EP2021/063305
§ 371 (c)(1),
(2) Date: Feb. 5, 2023

(87) PCT Pub. No.: WO2022/028747
PCT Pub. Date: Feb. 10, 2022

(65) Prior Publication Data
US 2023/0296173 A1    Sep. 21, 2023

(30) Foreign Application Priority Data
Aug. 6, 2020   (DE) ..................... 10 2020 120 770.0

(51) Int. Cl.
*F16J 9/14*    (2006.01)
*F16J 9/20*    (2006.01)

(52) U.S. Cl.
CPC    *F16J 9/206* (2013.01); *F16J 9/14* (2013.01)

(58) Field of Classification Search
CPC .................................... F16J 9/206; F16J 9/14
See application file for complete search history.

(56) References Cited

U.S. PATENT DOCUMENTS

| | | | | |
|---|---|---|---|---|
| 2,112,103 A | * | 3/1938 | Kottusch .................. | F16J 9/203 |
| | | | | 277/924 |
| 2,372,979 A | * | 4/1945 | Phillips .................... | F16J 9/206 |
| | | | | 29/888.07 |
| 2,428,031 A | * | 9/1947 | Mayes ....................... | F16J 9/12 |
| | | | | 416/174 |
| 3,198,531 A | * | 8/1965 | Brenneke ................. | F16J 9/206 |
| | | | | 277/463 |

(Continued)

FOREIGN PATENT DOCUMENTS

| | | |
|---|---|---|
| DE | 4025868 A1 | 2/1992 |
| JP | H0253251 U | 4/1990 |

(Continued)

*Primary Examiner* — Vishal A Patel
(74) *Attorney, Agent, or Firm* — Dickinson Wright PLLC (57) ABSTRACT

An oil scraper ring (4) includes a ring element (6), having an upper ring edge (8), a lower ring edge, a ring inner side and a ring outer side (14. The ring element (6) is provided with two opposing contact surfaces (20), between which there is a ring gap (18. The ring element (6) is provided with at least one scraper bar (24, 26) on the ring outer side (14. The oil scraper ring (4) is provided with two recesses (28), each arranged on each contact surface (20), and each adjoining at least on the ring outer side (14), the respective contact surface (20) and the upper ring edge (8).

7 Claims, 9 Drawing Sheets

(56) References Cited

U.S. PATENT DOCUMENTS

| | | | | |
|---|---|---|---|---|
| 3,396,976 A * | 8/1968 | Theodorus | ............... | F16J 9/00 |
| | | | | 277/447 |
| 4,848,212 A * | 7/1989 | Kawano | ................. | F16J 9/14 |
| | | | | 92/158 |
| 5,241,748 A * | 9/1993 | Ishida | ................... | C23C 8/38 |
| | | | | 29/888.074 |
| 8,017,057 B2 * | 9/2011 | Edwards | ............ | B29C 43/006 |
| | | | | 264/109 |
| 9,657,839 B2 * | 5/2017 | Meacham | .............. | F16J 9/12 |
| 2007/0176371 A1 * | 8/2007 | Yamada | ................. | F16J 9/14 |
| | | | | 277/497 |
| 2010/0162987 A1 * | 7/2010 | Ishida | .................... | F16J 9/14 |
| | | | | 123/193.6 |
| 2012/0304854 A1 * | 12/2012 | Hold | .................. | F16J 15/166 |
| | | | | 92/172 |
| 2017/0097091 A1 * | 4/2017 | Cleeves | .............. | F02B 75/282 |
| 2017/0130840 A1 * | 5/2017 | Mittler | ................... | F16J 9/20 |
| 2017/0321803 A1 * | 11/2017 | Meacham | ............ | F16J 9/203 |
| 2018/0299011 A1 * | 10/2018 | Ohki | ..................... | F02F 5/00 |

FOREIGN PATENT DOCUMENTS

| | | | |
|---|---|---|---|
| JP | H0254351 U | 4/1990 | |
| JP | H04132260 U | 12/1992 | |

* cited by examiner

OIL SCRAPER RING AND PISTON RING SET FOR AN INTERNAL COMBUSTION ENGINE

BACKGROUND

1. Technical Field

The present invention relates to an oil scraper ring and a piston ring set comprising such an oil scraper ring which is to be inserted in an internal combustion engine, preferably in a four-stroke engine. The oil scraper ring here comprises a ring gap which is designed differently at the top and at the bottom, i.e. on the combustion chamber side and on the crankcase side.

2. Related Art

Hitherto, oil scraper rings having constant ring gaps are known. These constant ring gaps are normally selected to be as small as possible in order to achieve a maximum oil scraping effect. Whilst "blow-by" gases must flow through this ring gap, the choice of a narrow ring gap results in gas pressure above the ring. This high pressure can result in an instability at the second ring which has negative effects on the entire functional performance of the ring.

SUMMARY

The present invention attempts to combine the advantage of small ring gaps with regard to the oil scraper effect with a larger ring gap which prevents the build-up of pressure and the instability of the second ring. Furthermore, the invention attempts to reduce any oil flow in the upwards direction, i.e. to the combustion chamber, in a throttled mode or in overrun mode.

The present invention is in particular directed towards becoming effective in operating states in which the pressure in the combustion chamber drops below the ambient pressure in order, on the one hand, to reduce the amount of oil which can enter into the combustion chamber and at the same time, to increase the stability of the second or middle (oil control) piston ring by reducing the building-up of gas pressure or gas pressure difference.

A larger effective gap at the upper edge of the oil scraper ring allows a freer gas flow at high load when the ring is pressed against the upper piston ring groove edge due to mass or inertial forces. The reduced amount of oil which can enter into the combustion chamber has the effect that less oil is burnt with the result that in particular particle emissions, particularly after overrun operation, can be reduced.

The present oil scraper ring having a non-uniform ring gap is also set up to guide a portion of the blow-by into the intermediate space between the two scraper bars of the piston ring so that a portion of the blow-by can flow through radial openings in the oil scraper ring inwards into the ring groove base from where it is guided through oil drain channels or the underlying axial play into the crankcase. In this case, it should be borne in mind that the blow-by is reduced by the two compression rings located thereabove to such an extent that such a drain does not cause any significant problems. The blow-by flow in particular enables oil droplets to be entrained from the gap between the two oil scraper bars and supplied to the crankcase.

According to an exemplary embodiment of the present invention, an oil scraper ring comprises a ring element, having an upper ring edge, a lower ring edge, a ring inner side located in the radial direction and a ring outer side located in the radial direction. The ring element is provided with two contact ends, between which there is a ring gap. The contact ends have opposite contact surfaces. The ring element is provided with at least one scraper bar on the ring outer side. The oil scraper ring according to the invention has respectively two (opposite) recesses, each in the region of the contact ends), each adjoining at least on the ring outer side, the respective contact surface and the upper ring edge. The respective recess thus extends in the region in which the one corner that would have been formed from the surface of the ring outer side or a bar, the respective contact surface and the upper ring edge, would be located. The two opposite recesses located on both sides of the ring gap broaden the ring gap in particular between the edges of the upper scraper bar.

Of the two recesses respectively one is arranged on each of the contact ends. The respective recess thus extends in the region of the surface of the ring outer side or a bar, the respective contact surface and the upper ring edge. The recess extends in each case in the region of an upper scraper bar. This enables the remaining ring gap to be configured a factor of 2 to 3 (substantially) smaller than would be possible with conventional rings. The ring gap at the upper edge surface is a factor of 2 to 5 larger than the ring gap in the respectively installed state.

According to a further exemplary embodiment, the recesses are designed symmetrically to a mirror plane of the contact surfaces. The mirror plane of the contact surfaces is defined in this case by the contact surfaces, wherein a centre point of the piston ring and the axial direction should lie in the mirror plane.

In an additional embodiment of the oil scraper ring, the ring element has two scraper bars, an upper scraper bar on the combustion chamber side and a lower scraper bar on the crankcase side. The recess extends in this case into a region of an upper scraper bar. In this embodiment, the upper scraper ring is shorter in the circumferential direction than the lower scraper ring. This gives a larger ring gap at the upper scraper ring, with the result that combustion gases can pass through the larger upper gap into the region between the scraper bars and can flow from there via oil passages running in the radial direction into the space behind the oil scraper ring. Here oil droplets from the region between the scraper bars can be conveyed behind the oil scraper ring. During a downwards movement of the piston, the piston ring seals less tightly which is why a pressure equalization can take place through the oil drains in the oil scraper piston ring groove to the crankcase under all operating conditions.

In a further exemplary embodiment of the oil scraper ring, the recess has the shape of a part of a sphere, a cylinder, a cone or a rectangle. The recess is therefore delimited by a part of a spherical surface, a cylindrical surface, a conical surface or a cuboid surface.

In an additional exemplary embodiment of the oil scraper ring, the recesses on the contact surface further adjoin the contact surface on the ring inner side. In this embodiment, the recesses on the contact surfaces extend in the region in which an edge between the contact surface and the upper ring edge would extend, the recesses of this embodiment forming a passage in the radial direction from the ring inner side to the ring outer side. Here blow-by gases can pass directly behind the ring.

In a further exemplary embodiment of the oil scraper ring, the oil scraper ring is provided with at least one further radial recess in the region spaced apart from the contact ends, which extends at the upper ring edge from the ring outer side in the direction of the ring inner side. In this embodiment, this further recess ends before reaching the ring inner side. In a further embodiment, this at least one further recess extends as far as the ring inner side and forms a channel in the radial direction.

In an additional embodiment of the oil scraper ring at least one further recess or radial recess and the two recesses at the contact are distributed uniformly over the circumference of the piston ring, wherein the two recesses at the contact are considered as one recess divided by the contact. Here the recesses are arranged at a distance of, for example, 180°, 120°, 90°, 60° or 30° with respect to one another. For higher numbers of recesses, [they are] distributed accordingly.

In an additional embodiment of the oil scraper ring, this is designed as a two-part oil scraper ring. In this embodiment, the oil scraper ring has a groove running in the circumferential direction on the ring inner side in which at least one expander such as a hose spring is inserted.

According to a further three-part embodiment of the oil scraper ring, this effect is ensured by a different choice of "rail" contact play. In a further preferred embodiment, an even number of further recesses or radial recess is used. As a result of the closer or nearer arrangement with respect to one another in the circumferential direction, the region of the ring back remains free from recesses, with the result that the risk of a ring break can be reduced at the most severely loaded point during assembly of the ring. When using an even number of further recesses or radial recess which are arranged symmetrically to the mirror plane running through the ring gap, the ring back remains free of recesses and the overall stability of the ring is improved.

According to a further exemplary embodiment of the oil scraper ring, the two recesses and the at least one radial recess each have different heights or depths in the radial direction, wherein the two recesses directly at the ring gap have the greatest depth (in the axial direction). The respectively adjacent radial recesses have a smaller depth in the axial direction and finally the radial recesses arranged closest to the ring back are designed to be the flattest.

According to another exemplary embodiment of the oil scraper ring, the two recesses or the at least one radial recess have a depth which is between 0.1 and 0.3 mm. The depth is measured in the axial direction in this case.

According to an additional exemplary embodiment of the oil scraper ring, the two recesses and/or the at least one radial recess are designed so that they do not interrupt the upper scraper ring.

According to a further aspect of the present invention, a piston ring set with oil scraper ring of the previously described oil scraper rings and further comprising at least one oil control ring (or middle piston ring) is provided, wherein preferably another compression ring can also be provided. The oil control ring comprises a control ring element which comprises an upper control ring edge, a lower control ring edge, a control ring inner side located on the inside in the radial direction and a control ring outer side located on the outside in the radial direction. The control ring element is provided with two control contact ends between which a control ring gap is located. The contact ends have opposite control contact surfaces. The control ring in the region of the control contact ends is provided with two recesses in each case which at least on the ring outer side each adjoin the respective contact surface and the upper ring edge. In the piston ring set two piston rings are provided in the region of the respective contact, wherein the recesses at the contact widen with respect to one another in each case.

THE DRAWINGS

The invention is described hereinafter with reference to schematic prior-art figures and exemplary embodiments of the present invention.

DETAILED DESCRIPTION

In the following both in the figures and in the text of the description, the same or similar reference numerals are used to refer to the same or similar elements and components.

Figure 1:
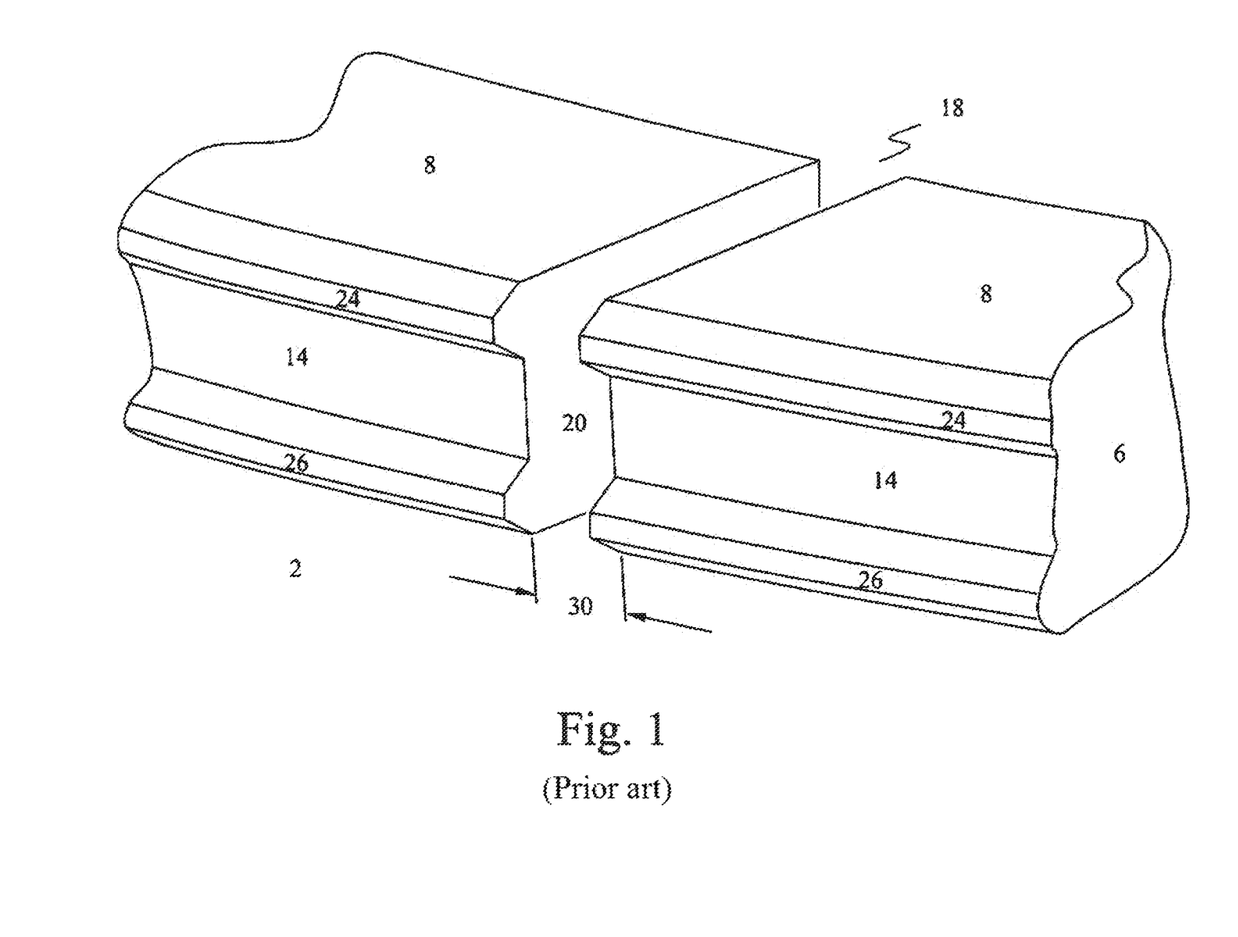
FIG. 1 shows a partial view in the region of a ring gap of a conventional oil scraper ring.

FIG. 1 shows a perspective partial view of a conventional oil scraper ring 1 in the region of a ring gap 18. The conventional oil scraper ring 2 comprises a ring element 6 having an upper ring edge 8, a concealed lower ring edge, a ring inner side which is also not visible and a ring outer side 14. The ring element 6 is interrupted at a contact wherein two opposite contact surfaces 20 are formed between themselves between a ring gap 18. Here and in the following the ring gap dimensions are always considered in the installed state. The ring element 6 is provided with at least one scraper bar 24, 26 on the ring outer side. The oil scraper ring according to the prior art and/or according to the invention can further be provided with oil passages which extend between the scraper bars from the ring outer side in the direction of the ring inner side which however are not shown for reasons of clarity.

Figure 2:
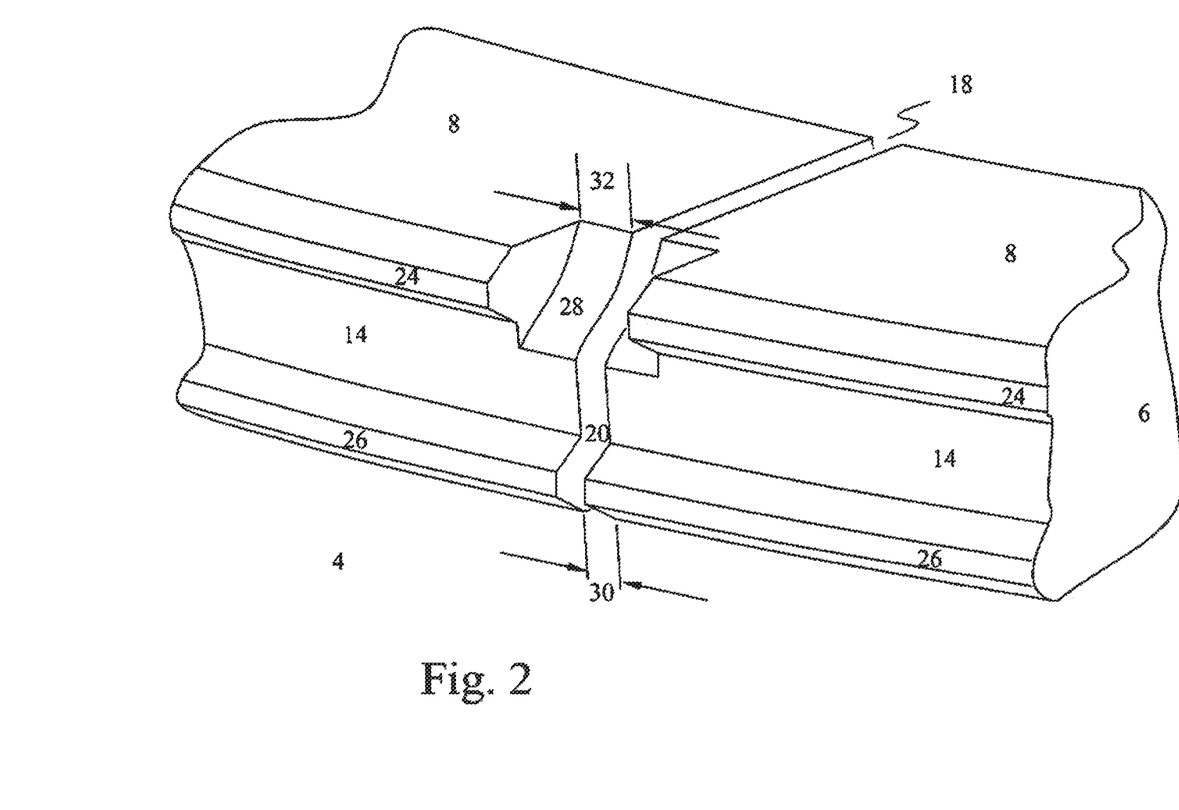
FIG. 2 shows a diagram of a partial view of an oil scraper ring according to the invention with sloping recesses at the ring gap.

FIG. 2 shows a diagram of a perspective partial view of an oil scraper ring 4 according to the invention in the region of the ring gap 18 with sloping recesses 28. Here also the oil scraper ring 4 according to the invention comprises a ring element 6. The ring element here comprises an upper ring edge 8, a lower ring edge which cannot be seen, a concealed ring inner side and a ring outer side 14. The ring element 6 has a ring gap 18 which is delimited by two opposite contact surfaces 20. On its ring outer side 14 the ring element 6 is provided with at least one scraper bar 24, 26. In the region of the contact surfaces 20 the oil scraper ring 4 has two recesses 28, one on each contact surface 20. Each of the recesses in this case adjoins the ring outer side 14, the respective contact surface 20 and the upper ring edge 8. In FIG. 2 the recesses each approximately correspond to a triangular prism. Here, blow-by gases which have passed at least two compression or oil control rings located one above the other can flow into an intermediate chamber between the upper and the lower scraper bar (24, 26). From there the blow-by gases can flow in the circumferential direction and flow through oil passages not shown inwards in the direction of the oil scraper ring groove base and thereby entrain oil droplets. This allows more oil to be fed back in the direction of the crankcase, wherein in particular in an overrun mode less oil can enter into the combustion chamber.

Figure 3:
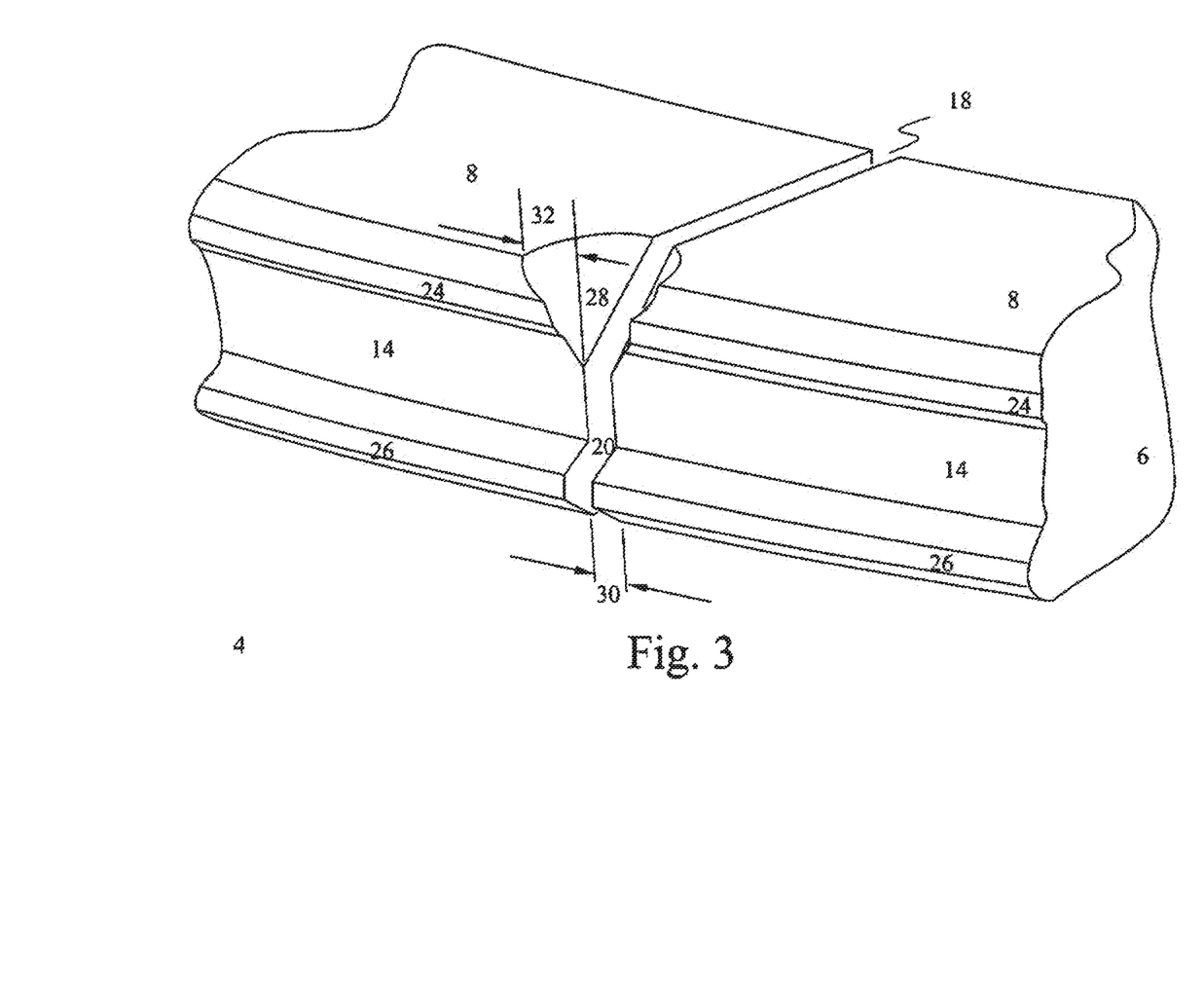
FIG. 3 shows a partial view of an oil scraper ring according to the invention with recesses at the ring gap which are delimited by a partial surface of a cone surface.

FIG. 3 shows a partial view of an oil scraper ring according to the invention which corresponds to FIG. 3 apart from the shape of the recesses. Instead of recesses having a triangular cross-section, recesses are used here which are delimited by a part of a cone surface. As a result of this shape, the blow-by gases can flow even better in the direction of the intermediate space between the upper and the lower scraper bar 24, 26.

Figure 4:
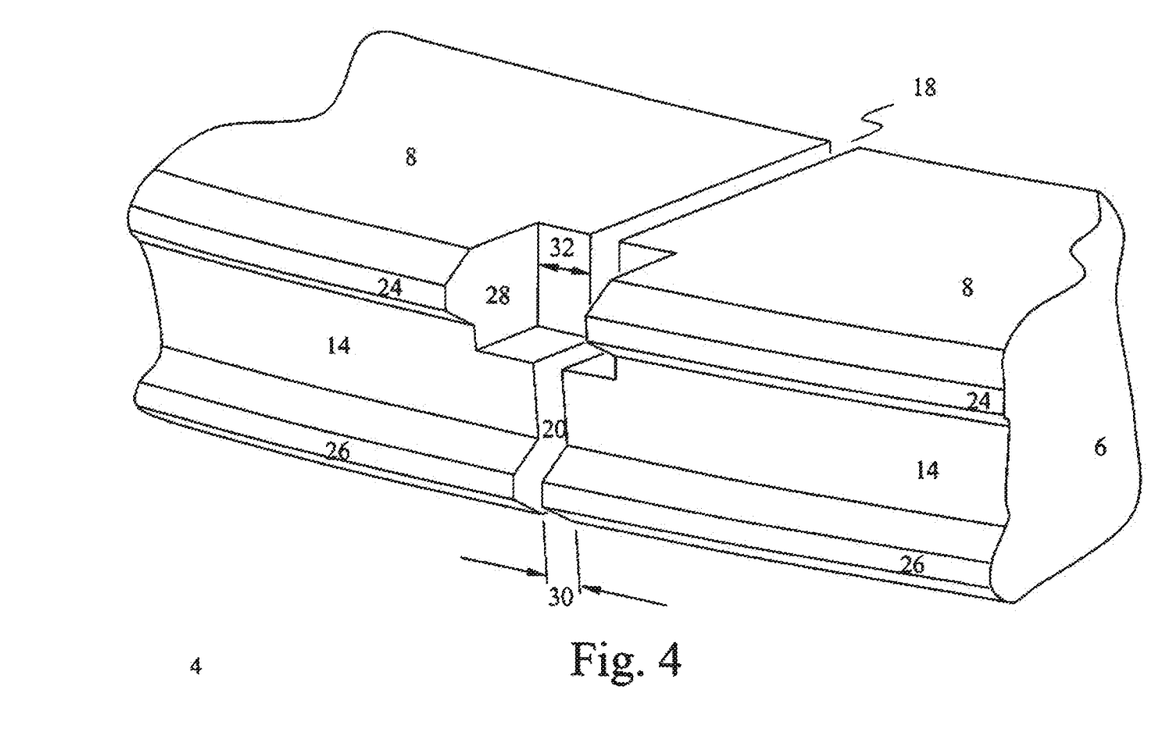
FIG. 4 shows a diagram of a partial of an oil scraper ring according to the invention with cuboid recesses at the ring gap.

FIG. 4 shows a further possibility for configuring the shape of the recesses 28. The other parts of FIG. 4 correspond to FIGS. 2 and 3. The recesses 28 of FIG. 4 are delimited by cuboid surfaces.

Figure 5:
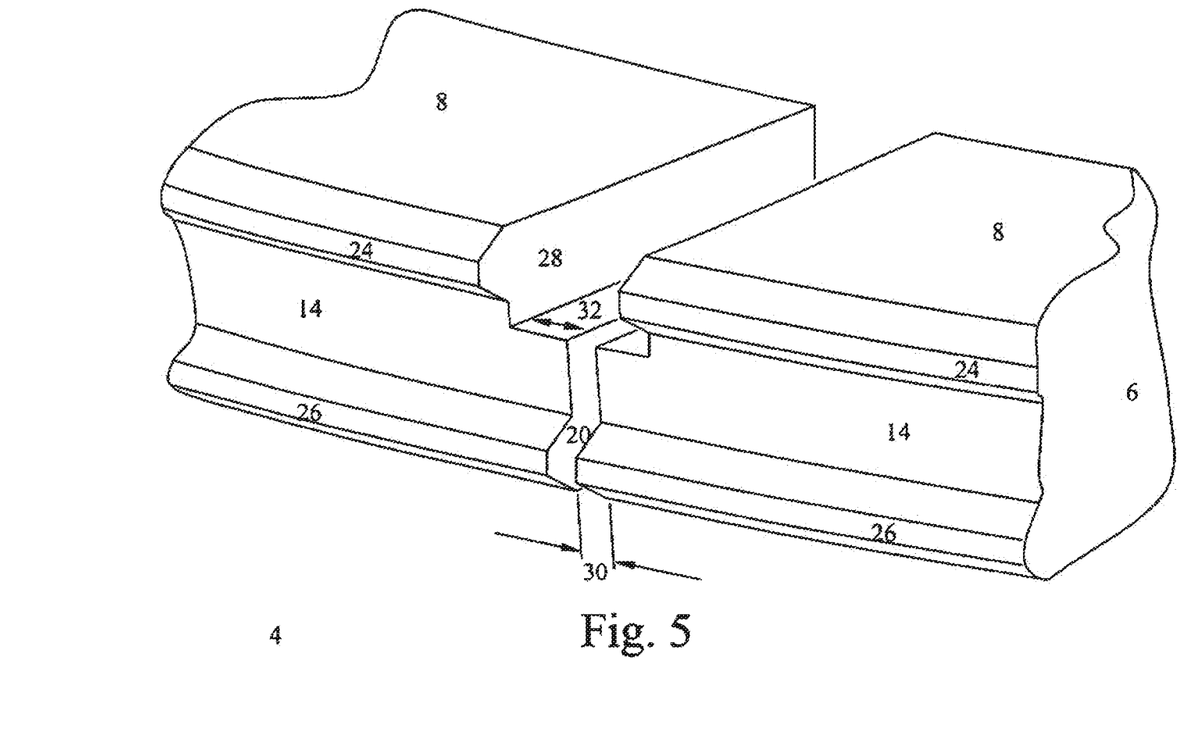
FIG. 5 shows a partial view of an oil scraper ring according to the invention with recesses at the ring gap which extend from an outer side to an inner side.

FIG. 5 shows a further possible embodiment of the ring gap 18 or the recesses 28. As in FIG. 4, the recesses 28 of FIG. 5 are delimited by cuboid surfaces, wherein the recesses extend in the radial direction completely through the oil scraper ring 4. Here the blow-by gases can also flow directly through the recesses 24, 26 in the direction of the ring groove base.

Figure 6:
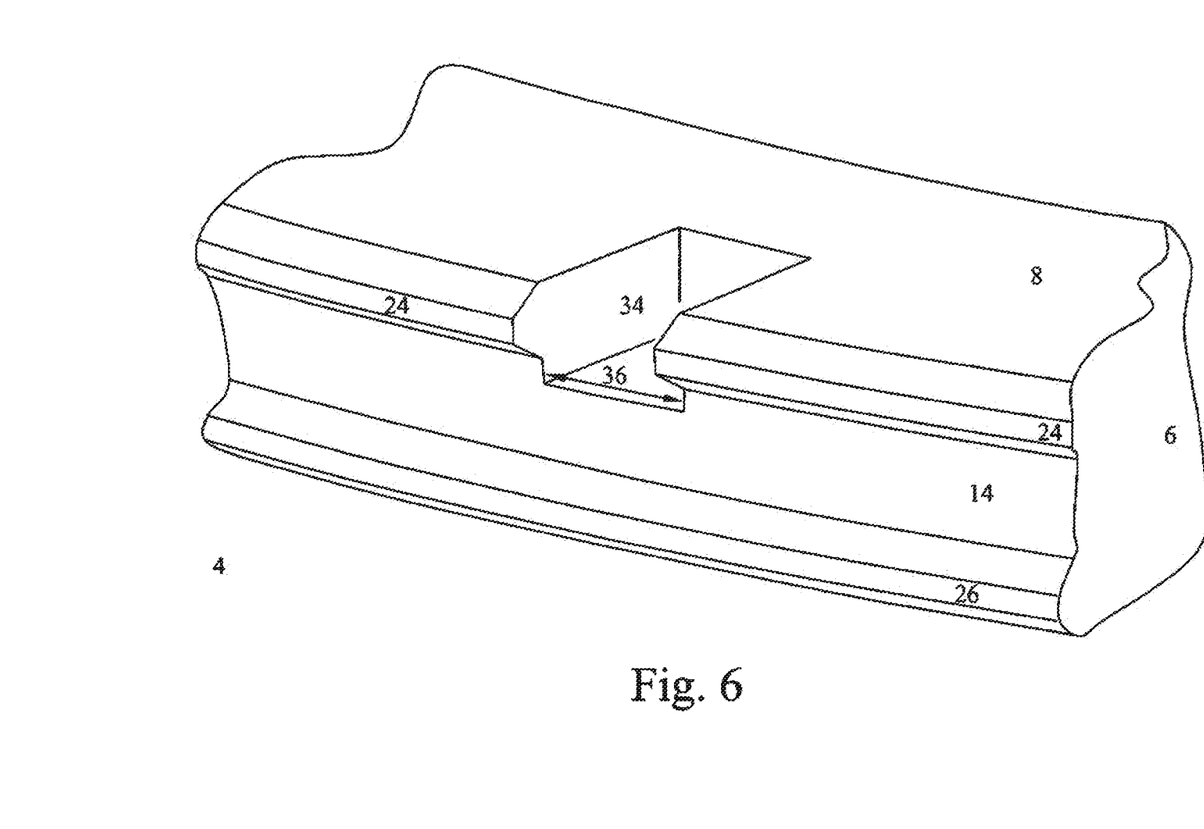
FIG. 6 shows a partial view at a point spaced apart from the ring gap at which a radial recess is provided which interrupts the upper scraper bar.

FIG. 6 shows an embodiment of an oil scraper ring in which the recesses of FIG. 4 are used at a location spaced apart from the ring gap and the contact surfaces. These are designated as radial recesses 34 in order to be able to distinguish them from the recesses at the ring gap. Here also this is based on the principle of achieving an improved flow from outside to inside through the oil scraper ring by the blow-by gases.

Figure 7:
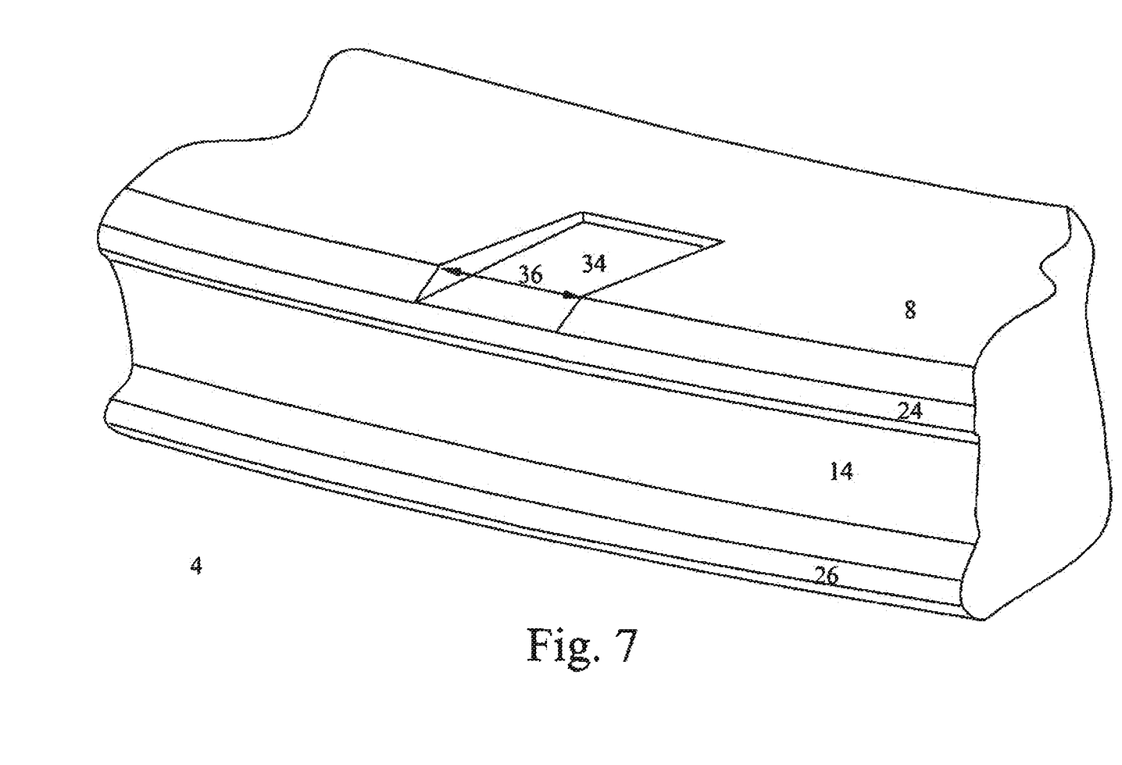
FIGS. 7 and 8 show diagrams of further versions of a radial recess which in each case are not interrupted by an upper scraper bar.

In FIG. 7 the radial recess 34 of FIG. 6 is designed to be only very flat so that the radial recess 34 does not interrupt the upper scraper bar 24 in the axial direction. The radial recess 34 in FIG. 7 extends in the radial direction only over a part of the upper ring edge 8. The radial recess 37 forms over the entire upper ring edge 8 so that the radial recess only forms a passage to a piston ring groove base with a positively twisted oil scraper ring. If the oil scraper ring is negatively twisted, the continuous edge between the ring inner side and the upper ring edge abuts against an upper oil scraper piston ring groove of a piston and passage of oil in the radial direction is prevented.

Figure 8:
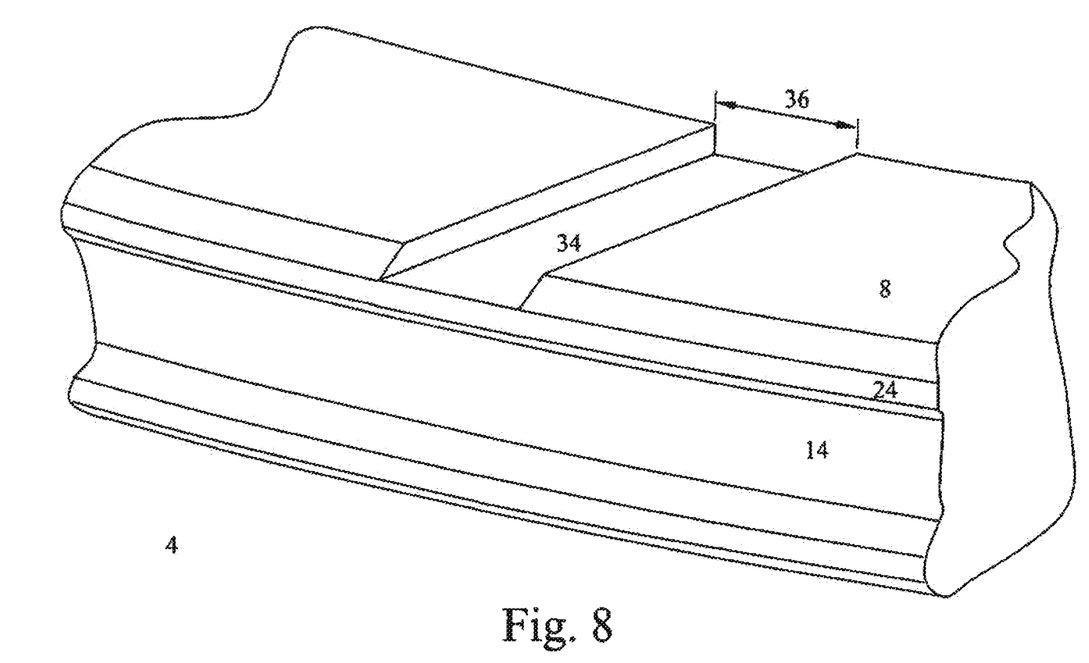

In FIG. 8 the radial recess 34 is only designed to be very flat as in that of FIG. 7 so that here also the radial recess 34 does not interrupt the upper scraper bar in the axial direction. In FIG. 8 the radial recess 37 extends over the entire upper ring edge 8 so that the radial recess forms a passage to a piston ring groove base in each twist position of the oil scraper ring.

Figure 9:
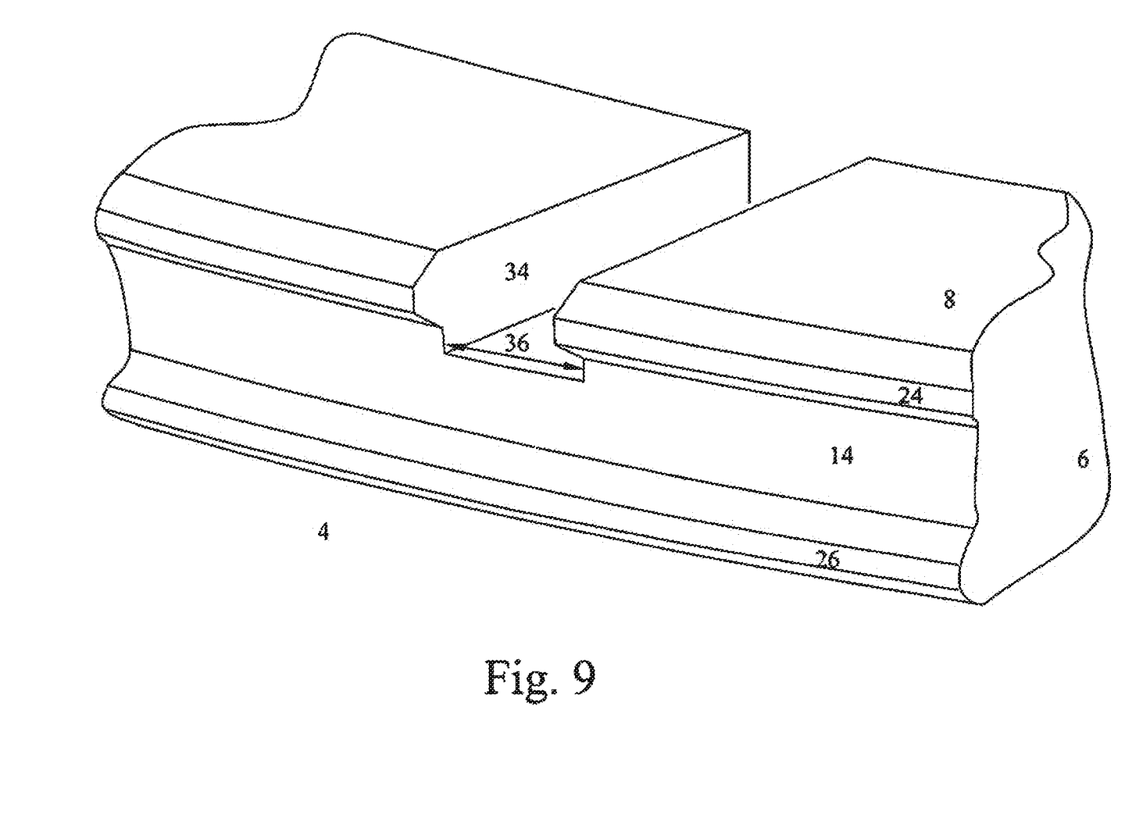
FIG. 9 shows a diagram of a further version of a radial recess which extends from the ring outer side to the ring inner side.

In FIG. 9 the radial recess 34 of FIG. 6 is lengthened as far as the ring inner side.

The invention claimed is:

1. An oil scraper ring comprising: a ring element, having an upper ring edge, a lower ring edge, a ring inner side and a ring outer side,
    wherein the ring element is provided with two opposing contact surfaces, between which there is a ring gap,
    wherein the ring element is provided with an upper scraper bar and a lower scraper bar each extending in a circumferential direction on the ring outer side,
    wherein the oil scraper ring is provided with two main recesses, each in the region of the contact surfaces and extending from the ring outer side toward the ring inner side, and each adjoining at least on the ring outer side, the respective contact surface and the upper ring edge,
    wherein the oil scraper ring is provided with at least one further radial recess in a region spaced apart from the ring gap, which extends at the upper ring edge from the ring outer side toward the ring inner side,
    wherein the main recesses and the at least one further radial recess do not extend completely through the ring element to the ring inner side or to the lower ring edge,
    wherein the main recesses extend into the upper scraper bar, and the upper scraper bar is shorter than the lower scraper bar due to the width of the main recesses, and
    wherein the main recesses are delimited by a part of a spherical surface, a cylindrical surface, a conical surface or a cuboid surface, and
    wherein the at least one further radial recess does not extend into the upper scraper bar.

2. The oil scraper ring according to claim 1, wherein the main recesses extend symmetrically to a mirror plane of the contact surfaces.

3. The oil scraper ring according to claim 1, wherein in an installed state, a width of the ring gap is defined as a distance of the contact surfaces in the circumferential direction, and wherein a width of a sum of the width of the recesses and the ring gap in the circumferential direction with an installed ring is a factor of 2 to 5 greater than the width of the ring gap.

4. The oil scraper ring according to claim 1, wherein the at least one further radial recess and the two main recesses on the ring gap are distributed uniformly over the circumference of the oil scraper ring.

5. The oil scraper ring according to claim 1, wherein the at least one further radial recess includes an even number of the further radial recesses, and the two main recesses are arranged closer to one another than the further radial recesses are to one another.

6. The oil scraper ring according to claim 1, wherein the two main recesses and the at least one further radial recess each have a depth in an axial direction, and the depth of the two main recesses is greater than the depth of the at least one further radial recess.

7. The oil scraper ring according to claim 1, wherein the two main recesses or the at least one further radial recess have a depth which is between 0.1 and 0.3 mm.

* * * * *